US011687427B2

(12) United States Patent
Daniali (10) Patent No.: US 11,687,427 B2
(45) Date of Patent: Jun. 27, 2023

(54) MULTIPLE XR EXTENDED REALITY APPLICATION VALIDATION PROCESS AND TESTING

(71) Applicant: T-Mobile USA, Inc., Bellevue, WA (US)

(72) Inventor: Ali Daniali, Tukwila, WA (US)

(73) Assignee: T-Mobile USA, Inc., Bellevue, WA (US)

(*) Notice: Subject to any disclaimer, the term of this patent is extended or adjusted under 35 U.S.C. 154(b) by 60 days.

(21) Appl. No.: 17/218,588

(22) Filed: Mar. 31, 2021

(65) Prior Publication Data

US 2021/0311844 A1 Oct. 7, 2021

Related U.S. Application Data

(60) Provisional application No. 63/004,994, filed on Apr. 3, 2020.

(51) Int. Cl.
*G06F 11/00* (2006.01)
*G06F 11/26* (2006.01)
*H04N 13/332* (2018.01)
*G06F 11/34* (2006.01)

(52) U.S. Cl.
CPC .......... *G06F 11/26* (2013.01); *G06F 11/3476* (2013.01); *H04N 13/332* (2018.05)

(58) Field of Classification Search
CPC .... G06F 11/26; G06F 11/3476; G06F 11/261; G06F 11/3612; G06F 11/3648; G06F 11/3664; H04N 13/332
See application file for complete search history.

(56) References Cited

U.S. PATENT DOCUMENTS

| | | | |
|---|---|---|---|
| 11,080,939 B1* | 8/2021 | LaFranchi | G06T 19/20 |
| 2017/0325109 A1* | 11/2017 | Cummings | H04W 24/06 |
| 2018/0063517 A1* | 3/2018 | Wang | H04N 13/344 |
| 2018/0150387 A1* | 5/2018 | Kogan | G06F 8/38 |
| 2019/0196940 A1* | 6/2019 | Psiaki | G06F 3/011 |
| 2020/0034281 A1* | 1/2020 | Hamid | G06F 11/3684 |
| 2020/0386807 A1* | 12/2020 | Li | G01H 1/00 |

* cited by examiner

*Primary Examiner* — Joseph D Manoskey
(74) *Attorney, Agent, or Firm* — Han Santos, PLLC (57) ABSTRACT

Techniques are disclosed herein that relate to performing and managing validation tests for XR applications to provide validation for the quality and usability of the applications within XR capable user devices. An example provides a testing system that receives a request to perform validation tests for an XR application executing on an XR capable device, the request including unique testing specifications corresponding to the XR capable device. The testing system may identify testing device capabilities to perform the validation tests and select a testing device of a plurality of testing devices based at least on the testing device capabilities associated with the testing device to execute the validation tests for the XR application according to the testing specifications and report test results from the validation tests to a testing log.

20 Claims, 6 Drawing Sheets

MULTIPLE XR EXTENDED REALITY APPLICATION VALIDATION PROCESS AND TESTING

CROSS-REFERENCE TO RELATED APPLICATION

This application claims priority to U.S. Provisional Patent Application No. 63/004,994, filed on Apr. 3, 2020, and entitled "XR Device Validation Process and Testing," which is hereby incorporated by reference in its entirety.

BACKGROUND

Equipment manufacturers must validate their equipment against various applications, network performance, and user behavior diversity. A device validation process and testing generally measure the user experience of the device and the results of the test may be analyzed to improve the device and address potential issues. In one example, user experience or performance of an application using a selection of augmented reality (AR)/virtual reality (VR)/mixed reality (MR), or collectively, extended reality (XR) capable user devices may be analyzed. When these devices are produced by different manufacturers according to their own specifications, a given function or feature in the test application may operate differently in different devices. Such differences can result in adverse effects such as different user experiences or errors. However, supporting the validation process and testing for individual devices can require specialized equipment and a wide range of resources. Accordingly, a systematic validation process may help identify and mitigate the identified issues in various testing environments.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Techniques are disclosed for performing and managing validation tests for XR applications to provide validation for the quality and usability of the applications within XR capable user devices. In one example, the validation process and testing may be applied to an extended reality (XR) application executed on one or more user devices or XR capable devices. As used herein, "XR" refers to all real and virtual environments generated by computer graphics and wearables. The "X" in XR is simply a variable that can stand for any letter. XR is the umbrella category that covers all the various forms of computer-altered reality, including Augmented Reality (AR), Mixed Reality (MR), and Virtual Reality (VR).

In one aspect, a testing system may include one or more testing devices that may be configured to perform one or more validation tests for an XR application being executed on a plurality of XR capable devices. The testing device may be a testing robot or a simulator that is configured to mimic or replicate usage of the XR application on the XR capable device by a user and/or execute a predetermined set of operations based at least on one or more of the validation tests being performed within a testing environment. The testing device may also be an edge device that is operatively connected to a wireless communication network.

The testing system may be operated by a testing entity. In one aspect, the testing system receives, from the testing entity, an XR application executing on an XR capable device. The testing entity may be a telecommunications service provider or other such third parties. The XR application may utilize one or more software modules that are integrated into the XR application. The one or more software modules can comprise a Software Development Kit (SDK) that are provided by an Original Equipment Manufacturer (OEM) of an XR capable device. The SDK may include libraries, documentation (e.g., device specification), code samples, processes, guides, and/or other components of software tools and programs such as an Application Programming Interface (API).

The testing system may receive a request, from the testing entity, to perform one or more validation tests for the XR application executing on an XR capable device. The request may at least specify usage of the one or more software modules and include testing specifications corresponding to an XR capable device, wherein the testing specifications may specify which validation tests to apply. In some examples, the validation tests may include performance tests, comfort, and usability tests, and input tests, and/or so forth. The testing specifications may also include information relating to the operating system, file system, hardware, and/or other software systems of an XR capable device that executes the XR application.

The testing system may perform different validation tests on different XR capable devices. For instance, the testing system may perform, via a first testing device, a first validation test on a first XR capable device, and perform, via a second testing device, a second validation test on a second XR capable device. Additionally, or alternatively, the testing system may perform the same validation test on multiple XR capable devices concurrently. The first testing device and the second testing device may be the same or different devices. In this regard, the testing system may implement a load-balancing scheme comprising a round robin scheme, a lowest load first scheme, or the fastest throughput scheme.

Upon performing the one or more validation tests for the XR application according to the testing specifications, the testing system may upload a validation report to external systems such as a testing log that is managed by the testing entity and/or to an OEM of an XR capable device. The validation report may include test results, metrics, event data, and/or other such data. The individual test results, metrics, event data, and/or other such data may be associated with a test case ID corresponding to a validation test executed on the respective XR capable device.

The testing log may be communicatively coupled to the testing and evaluation process monitoring server that may be operated by a testing entity. The testing and evaluation process monitoring server may store test data and test parameters for validation tests. In some aspects, the testing and evaluation process monitoring server may receive the validation report from the testing log and validate the XR application based at least on the results in view of the product requirements and the validation criteria. In some embodiments, the testing device may also validate the XR application based at least on one or more of the results in the validation report during the validation process as one or more tests are being performed.

The techniques described herein may streamline the validation testing process for XR applications operating on multiple XR capable devices. The techniques described herein may be implemented in a number of ways. Example implementations are provided below with reference to the following figures.

Example Network Architecture

Figure 1:
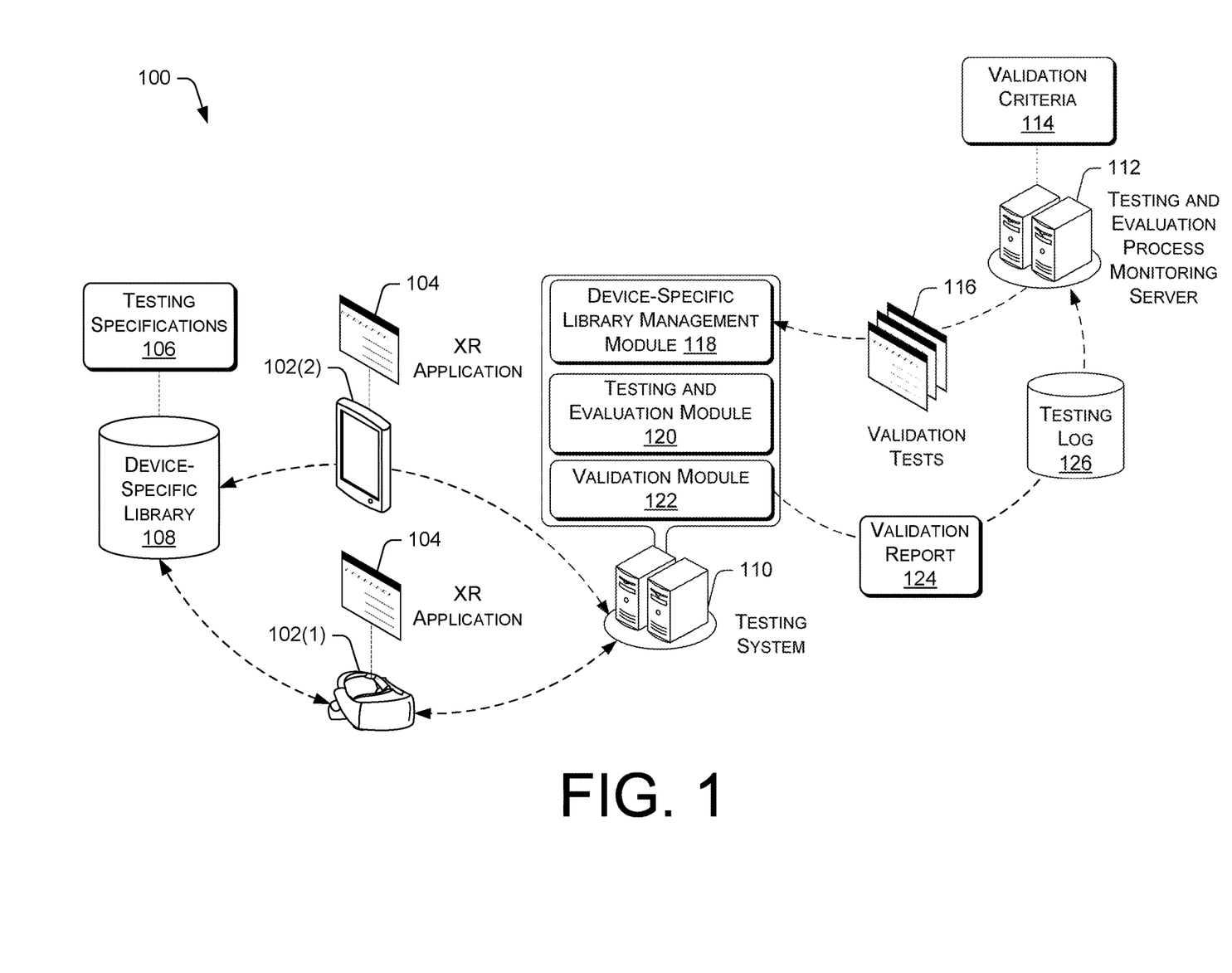
FIG. 1 illustrates an example of a network architecture for managing multiple XR device validation processes and performing testing.

FIG. 1 illustrates an example architecture 100 for performing and managing validation tests for XR applications to provide validation for quality and usability of the applications within XR capable user devices. The architecture 100 may include one or more XR capable devices 102(1) and 102(2). The individual XR capable devices 102(1) and 102(2) may be produced or provided by a unique OEM. In FIG. 1, the first XR capable device 102(1) may be a head-mounted device (HMD), and the second XR capable device 102(2) may be a smartphone. In various embodiments, the XR capable devices 102(1) and 102(2) may be other types of devices, such as a game console, a controller, an appliance, or other electronic devices having a wireless communication function that is capable of receiving input, processing the input, and generating output data.

The XR capable devices 102(1) and 102(2) are connected to a telecommunication network utilizing one or more wireless base stations or any other common wireless or wireline network access technologies. The network can be a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

The XR capable devices 102(1) and 102(2) are configured to execute an XR application 104. Examples of XR applications 104 include architecture, visual art, commerce, education, emergency services, video games, medical, military, navigation, and workplace applications. In any of these applications, a user may wear the first XR capable device 102(1) such as an HMD to interact with one or more digitally-generated entities (e.g., virtual content) displayed by the first XR capable device 102(1). Additionally, a user may utilize the second XR capable device 102(2) such as a smartphone to interact with one or more digitally-generated entities displayed by the second XR capable device 102(2).

The individual XR capable devices 102(1) and 102(2) correspond to unique testing specifications 106. The testing specifications 106 may include information relating to the operating system, file system, hardware, and/or other software systems of an XR capable device. During an onboard process, a testing system 110 may query a device-specific library 108 requesting testing specifications 106 of an XR capable device. The device-specific library 108 may be maintained and operated by an OEM. The device-specific library 108 may include logical organizational structures that store data, such as relational databases, object databases, object-relational databases, and/or key-value databases. Accordingly, the device-specific library 108 may store multiple records such as testing specifications 106 and one or more software modules (e.g., Software Development Kit (SDK)).

Additionally, the testing system 110 may register the XR capable devices 102(1) and 102(2) with a testing and evaluation process monitoring server 112 by providing device identifiers (e.g., serial numbers), device type (e.g., HMD, smartphone, gaming apparatus, etc.), device model, manufacturer information, and/or other information that is associated with the XR capable devices 102(1) and 102(2). In some aspects, the testing system 110 may provide the testing specifications 106 to the testing and evaluation process monitoring server 112.

The testing and evaluation process monitoring server 112 is configured to provide testing configurations to the testing system 110 based at least on the testing specifications 106. In some aspects, the testing and evaluation process monitoring server 112 may store validation criteria 114 (e.g., acceptance level, the threshold for the number of defects identified, expected result) corresponding to various validation tests. The testing and evaluation process monitoring server 112 may also include product requirements (e.g., implementation requirements, performance targets, service requirements, functions and features, quality requirements, customer experience/requirements, operations requirements, other technical requirements). The testing configurations may also be based at least on product requirements and the validation criteria. The testing and evaluation process monitoring server 112 may also instruct the testing system 110 which validation tests 116 to apply and the pre-requisite for each test.

The testing system 110 may include a device-specific library management module 118. The device-specific library management module 118 may include an interface component for communicating with the device-specific library 108 and other components of the testing system 110 such as the testing and evaluation module 120 and the validation module 122. In some aspects, the device-specific library management module 118 may use a header-based authentication model to a request from the device-specific library 108 testing specifications 106 and/or one or more software modules (e.g., SDK).

Authentication credentials may be associated with the testing system 110 and/or the testing entity. In some aspects, the authentication credentials may be associated with an account identifier for a test account, a developer account, and/or a beta account of the testing entity. As the testing system 110 performs multiple validation tests for multiple XR capable devices, the device-specific library management module 118 is configured to manage a data structure (e.g., a mapping table) that may be stored locally or in a remote data store. In some examples, the device-specific library management module 118 may implement a management logic for testing specifications and SDKs from multiple device-specific libraries operated by one or more OEMs.

The testing and evaluation process monitoring server 112 may store test data and test parameters for the validation tests 116. The validation testing may include testing of all permutations that impact three-dimensional (3D) and/or spatial applications. Areas considered in the robotic automated validation testing include performance, comfort and usability, and input, in addition to areas that require special handling or attention to details. The various validation tests 116 may be performed via the testing system 110. The testing system 110 may comprise general-purpose computers, such as desktop computers, tablet computers, laptop computers, servers (e.g., on-premise servers, edge servers), or other electronic devices that are capable of receiving input, processing the input, and generating output data. The testing system 110 may store data in a distributed storage system, in which data may be stored for long periods and replicated to guarantee reliability. The testing system may be equipped with various testing devices (e.g., robotic devices) including hardware that is configured to emulate human movements or replicate usage of the XR application 104 on the XR capable devices 102(1) and 102(2) and/or execute a predetermined set of operations based at least on one or more of the validation tests being performed within a testing environment. In various embodiments, the testing devices may separate components that are in communication with the testing system, wherein the testing system may be located in a remote location.

For instance, the testing system 110 may implement a robotic device that is equipped with an image capturing device or an image sensor. The robotic device may be configured to support or wear the first XR capable device 102(1) (i.e., an HMD) such that the image capturing device or the image sensor may be aligned to view the display screen of the first XR capable device 102(1). In another example, the robotic device may include a robotic hand and/or digits that may be configured to secure a grasp around the second XR capable device 102(2) (i.e., a smartphone) and interact with the touchscreen of the second XR capable device 102(2). Accordingly, the robotic device comprises mechanical components (e.g., suspensions and actuators) for facilitating movement that is equivalent to human gesture (e.g., head movement, neck movement, arm movement, hand movement, finger movement, height adjustment, etc.) that may be communicatively coupled to a navigational or directional component in response to movement commands by a test administrator and for allowing tactile and/or other interaction with the XR capable user device being tested. The components (e.g., sensors) of the robotic device may be interchangeable in some embodiments to enable the robotic device to perform different validation tests 116. The robotic device may also include additional user interface, data communication, or data storage hardware. For example, the user interfaces may include a data output device (e.g., visual display, audio speakers), and one or more data input devices (e.g., sensors) for receiving user input.

The performance tests determine whether the XR application 104 performs acceptably under certain performance requirements (e.g., access by a large number of users) or different environmental conditions. For example, the testing system may conduct testing in various real-world locations to determine how an XR capable user device depicts via the XR application 104 an augmented, virtual, or mixed world environment representing different real-world locations. In another example, the testing system may conduct testing in controlled and uncontrolled environments to determine how an XR capable user device responds to audio cues and voice commands or input in different noise settings in the XR application 104. The different real-world locations may be outdoor or indoor locations. In the latter case, the real-world locations may be different rooms, floors, and hallways of an interior of a building. The interior of the building may include non-standard features such as angled walls and ceilings, curved walls and ceilings, and/or so forth. Tests may also be conducted in exterior environments. Additionally, testing may be conducted under different lighting conditions (i.e., light and dark environments) to determine whether the lighting conditions affect the rendering of the augmented, virtual, or mixed world environment.

The different environmental conditions may also impact load conditions. For example, the different environmental conditions can include network traffic density that may correspond to urban environments, rural environments, indoor locations, outdoor locations, and/or so forth. Accordingly, the objective of the performance tests may be to determine whether a network coverage can support the XR application 104 at a peak user level, an average user level, and a minimum user level (e.g., determine the quality of service (QoS) such as latency, packet loss, and jitter). The performance tests may also determine whether the XR application 104 performs acceptably under certain performance requirements when a network is changed to Wi-Fi from a cellular network or vice versa while moving around with the XR capable devices 102(1) and 102(2), or when only intermittent phases of connectivity are available. Additionally, the performance tests may help validate whether the response time of the XR application 104 is as per the requirements. In some aspects, the performance tests may also evaluate whether the energy consumption (e.g., battery lifespan) of the XR capable devices 102(1) and 102(2) can support the XR application 104 to perform under projected load volumes.

To change environmental conditions, the testing system 110 may implement a testing device that may be configured to move to various locations. The testing device may perform tests while stationary or in motion such that the testing may be performed while the testing device is traveling at different speeds and rotating or turning in different directions. The testing device may also move on an incline and decline such that the angle of the surface on which the testing device is supported may vary. Additionally, the height of the testing device may vary depending on the elevation of the surface on which the testing device is supported. The testing device may also move on uneven surfaces and navigate around obstacles.

The comfort and usability tests measure the usability of the XR application 104 executing on the XR capable user device 102(1) and 102(2). For example, the comfort and usability tests may measure the degree of viewing comfort for any given virtual content or another target. In this regard, the testing device may analyze the clip planes and how the augmented, virtual, or mixed world environments are rendered. Additionally, any movement or motion in the depth plane (e.g., motion toward or away from the testing device) may be measured and analyzed to determine whether the depth motion is likely to lead to visual discomfort or fatigue. Various techniques for measuring the degree of viewing comfort and detecting visual fatigue may be implemented. For example, a testing device may include a viewing distance estimator, which may be a component of an image sensor of the testing device to estimate a distance between a display of the testing device and the user, and calculate a distance between virtual content and the user based at least on the distance between the display of the testing device and the user. The distance between the virtual content and the user may correspond to visual fatigue parameter information. Accordingly, visual fatigue may be detected based at least on the distance between the virtual content and the user and corresponding visual fatigue parameter information.

In some aspects, the testing device may detect virtual movement that is inconsistent with actual movement as such inconsistency can lead to motion sickness and nausea for a user. For example, the rendering of the augmented, virtual, or mixed world environment may be inconsistent with the head movement or the orientation of the testing device. In another example, the testing device may move at a different pace or speed as it navigates in the augmented, virtual, or mixed world environment. Thus, the position of a target in the augmented, virtual, or mixed world environment may be different from the position of the same target in the real-world environment with respect to the testing device. More particularly, the target may appear to be further away from the testing device in the augmented, virtual, or mixed world environment than it is in the real world. In some aspects, the difference between the distance of the actual position of the target or the rendered position of the target relative to the testing device may be measured in order to determine the degree of discrepancies.

The input tests evaluate the interactions between the software modules of the XR application 104 and the operating system, file system, hardware (e.g., input devices such as a microphone, a keyboard/keypad, mouse devices, a touch-sensitive display that accepts gestures, voice or speech recognition devices, hand gesture recognition devices, etc.), and/or other software systems of the XR capable devices 102(1) and 102(2) on which the XR application 104 resides. In this regard, the testing device may adjust testing parameters for testing based on the particular XR capable user device being tested and provide different types of input. For example, an XR capable user device may comprise a peripheral input device that includes physical buttons and that respond to various degrees of movement. In another example, a different XR capable user device may not include a peripheral input device, but instead, respond to hand gestures. Additionally, the testing device may be configured to calibrate settings based at least on the particular XR capable user device being tested. In some aspects, the testing device may also test for gaze tracking to determine whether an XR capable user device depicts a proper view of an augmented, virtual, or mixed world environment. Various gaze tracking techniques may be implemented. For example, the testing device may track a cursor position projected in its visual field of view.

The testing system 110 may receive a request, from a testing entity, to perform one or more validation tests 116 for the XR application 104 executing on one or more XR capable devices 102(1) and 102(2). The request may include identifying information corresponding to a unique XR capable device and corresponding to a unique testing specification 110 associated with the XR capable device. Additionally, the request may specify one or more validation tests 116 to perform. In response to receiving the request, the testing system 110 may, via the testing and evaluation module 120, select a testing device from a plurality of testing devices of the testing system 110 to perform at least one of the one or more validation tests 116.

For instance, the testing system 110 may receive a request to perform the comfort and usability test. In response, the testing system 110 may select a testing device that may be equipped with image sensors to analyze how virtual content are depicted or projected as relative to the testing device in the augmented, virtual, or mixed world environment as the distance between the virtual content and the testing device changes. Additionally, the testing device may measure, via the image sensors, and analyze movement or motion in a depth plane to determine whether the depth motion is likely to lead to visual discomfort or fatigue.

Additionally, the testing and evaluation module 120 may select an additional testing device from the plurality of testing devices to perform an additional validation test according to the testing specifications 106. Accordingly, the testing and evaluation module 120 may select different testing devices to perform different tests for the XR application 104 executing on one or more XR capable devices 102(1) and 102(2). In some aspects, the testing system 110 may perform the same validation tests 116 on multiple XR capable devices 102(1) and 102(2) concurrently by employing multiple testing devices that are configured to perform the same validation tests 116. The multiple testing devices may be the same or different devices. In some aspects, the testing system 110 may implement a load-balancing scheme comprising a round robin scheme, a lowest load first scheme, or the fastest throughput scheme. For instance, the testing system 110 may include a tracking mechanism for various testing devices. The testing system 110 may select a first testing device of a plurality of testing devices to perform a first validation test if the first testing device is not conducting a validation test and a second testing device is in the process of conducting a validation test. Additionally, the testing system 110 may implement one or more processor queues, which may include a high priority processor queue and a low priority processor queue in which various tests may be placed during the validation process.

The testing system 110 comprises a validation module 122 that interfaces with the testing and evaluation module 120. Upon completing the validation testing, the validation module 122 may generate a validation test report 124 to be transmitted to a testing log 126. The validation test report 124 may include test results from the individual validation tests. Additionally, the validation test report 124 may include other test events from the individual validation tests. The testing log 126 may interface with the testing and evaluation process monitoring server 112. In some aspects, the testing log 126 may pass the validation test report 124 and/or event-related data to the testing and evaluation process monitoring server 112. The testing and evaluation process monitoring server 112 may also interface with OEMs and a network provider to receive product requirements and validation criteria. In response to receiving the validation test report 124, the testing and evaluation process monitoring server 112 may analyze the test results and perform validation of the XR application 104 based at least on the product requirements and the validation criteria.

If multiple validation tests are applied, the validation module 122 may analyze individual test results as the validation tests are completed. If the validation module 122 determines that a test result from a first validation test indicates that the XR application is not validated, then the validation module 122 may instruct the testing and evaluation module 120 to terminate or suspend the validation testing process before completing additional validation tests and transmit the validation test report 124 to the testing log 126. Alternatively, all of the validation tests may be completed before the validation module 122 validates the XR application 104.

Figure 2:
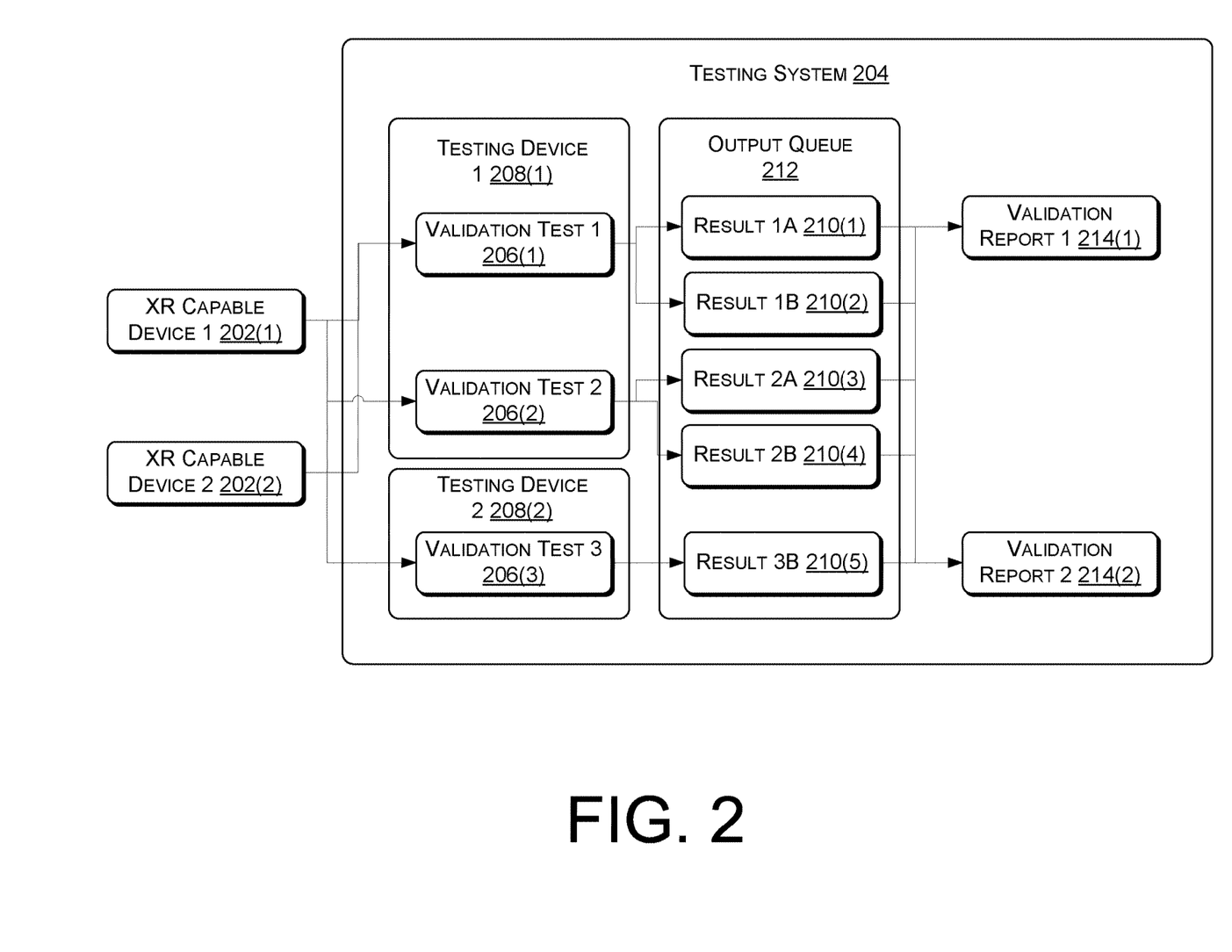
FIG. 2 is a flow diagram of an example validation process for multiple XR capable devices.

FIG. 2 is a flow diagram of an example validation process for multiple XR capable devices. The XR capable devices 202(1) and 202(2) may correspond to XR capable devices 102(1) and 102(2) of FIG. 1. Similarly, the testing system 204 corresponds to the testing system 110 of FIG. 1. The testing system 204 may receive a request, from a testing entity, to perform one or more validation tests 206(1)-206(3) for the XR application executing on the XR capable devices 202(1) and 202(2). The request may include testing specifications corresponding to the individual XR capable devices 202(1) and 202(2). The testing specifications may specify which validation tests 206(1)-206(3) to perform. Accordingly, the testing specifications corresponding to the first XR capable device 202(1) may indicate that the testing system should perform the first validation test 206(1) and the second validation test 206(2). Conversely, the testing specifications corresponding to the second XR capable device 202(2) may indicate that the testing system should perform the first validation test 206(1), the second validation test 206(2), and the third validation test 206(3). Based at least on the validation tests 206(1)-206(3) to perform, the request may also specify usage of the one or more software modules. Additionally, or alternatively, the testing system may identify the one or more software modules to utilize based at least on the validation tests 206(1)-206(3) to perform.

The first validation test 206(1) and the second validation test 206(2) may be performed by a first testing device 208(1) of the testing system 204. The third validation test 206(3) may be performed by a second testing device 208(2) of the testing system. The first testing device 208(1) and/or the second testing device 208(2) may be a robotic testing device. The testing system 204, via the testing and evaluation module, may select the first testing device 208(1) to perform the first validation test 206(1) and the second validation test 206(2) and may select the second testing device 208(2) to perform the third validation test 206(3). The first testing device may perform the first validation test 206(1) and the second validation test 202(2) for the XR application executing on the XR capable devices 202(1) and 202(2) concurrently. In some embodiments, the first testing device 208(1) may include multiple computing instances to perform validation testing on multiple devices. Additionally, or alternatively, the first testing device 208(1) may perform the first validation test 206(1) or the second validation test 206(2) on the first XR capable device 202(1) while the second testing device 208(2) may perform the third validation test 206(3) on the second XR capable device 202(2). In some aspects, the second testing device 208(2) may also be configured to perform additional validation tests such as the first validation test 206(1) and the second validation test 206(2).

In some aspects, the first testing device 208(1) and the second testing device 208(2) may provide the results 210(1)-210(5) in an output queue 212. For instance, the first testing device 208(1) may perform the first validation test 206(1) and the second validation test 206(2) and output the results 210(1) and 210(2) of the first validation test 206(1) and the results 210(3) and 210(4) of the second validation test 206(2) in the output queue 212. Similarly, the second testing device 208(2) may perform the third validation test 206(3) and output the results 210(5) of the third validation test 206(3) in the output queue 212. Upon completing the validation tests for the XR application on respective XR capable devices 202(1) and 202(2), the results may be consolidated and the validation module may generate the validation reports 214(1) and 214(2) for the individual XR capable devices 202(1) and 202(2) to be transmitted to a testing log.

Example XR Capable Device Components

Figure 3:
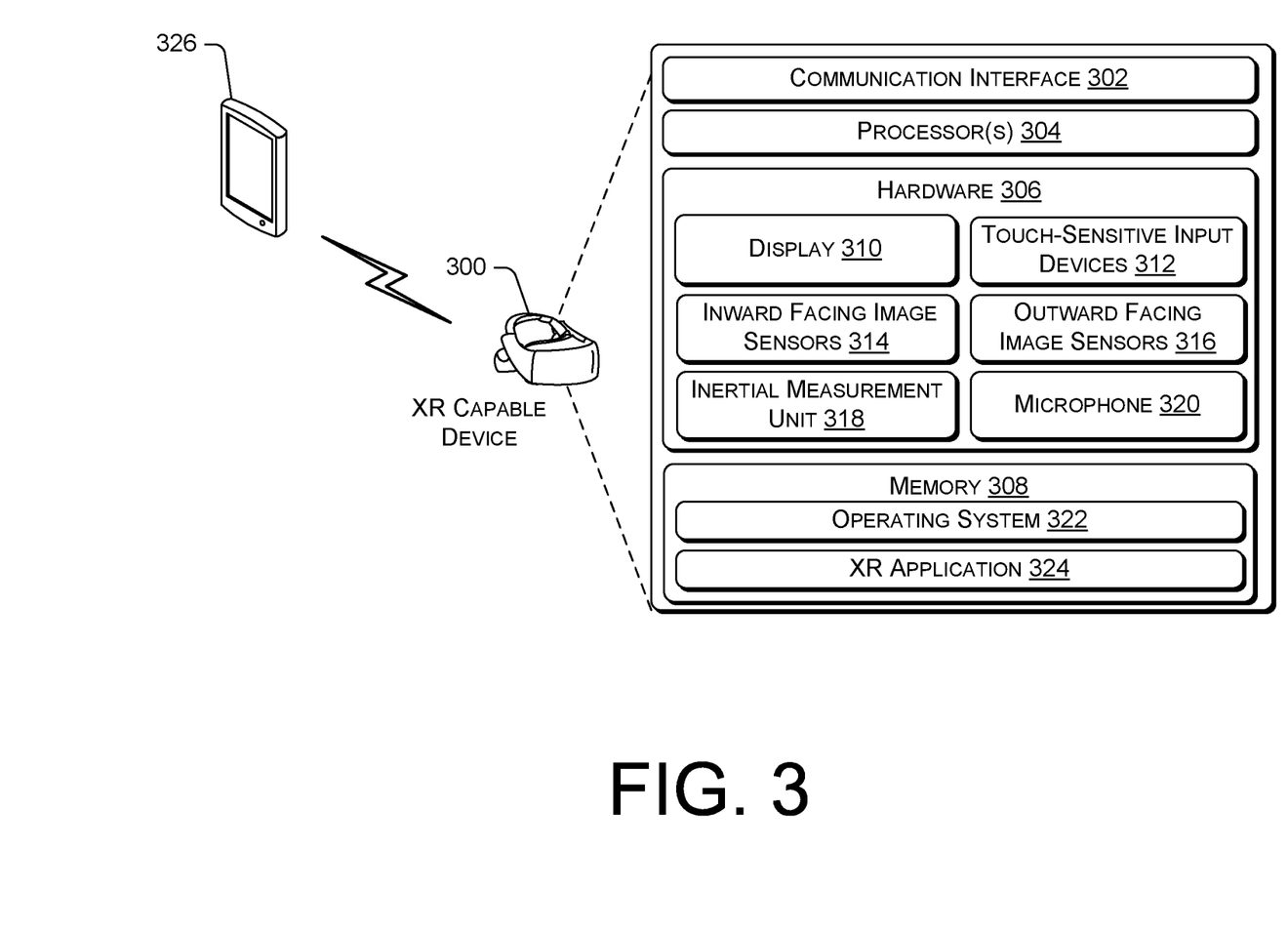
FIG. 3 is a block diagram showing various components of an illustrative XR capable device.

FIG. 3 is a block diagram showing various components of an illustrative XR capable device. It is noted that the XR capable device 300 as described herein can operate with more or fewer of the components shown herein. Additionally, the XR capable device 300 as shown herein or portions thereof can serve as a representation of one or more of the computing devices of the present system.

The XR capable device 300 may include a communication interface 302, one or more processors 304, hardware 306, and memory 308. The communication interface 302 may include wireless and/or wired communication components that enable the XR capable device 300 to transmit data to and receive data from other networked devices. In at least one example, the one or more processor(s) 304 may be a central processing unit(s) (CPU), graphics processing unit(s) (GPU), both a CPU and GPU or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 304 may also be responsible for executing all computer applications stored in the memory as will be described below, which can be associated with common types of volatile (RAM) and/or nonvolatile (ROM) memory. Generally, the hardware 306 may include additional user interface, data communication, or data storage hardware. For example, the user interfaces may include a data output device (e.g., visual display, audio speakers), and one or more data input devices. The data output devices may include but are not limited to, audio speakers and visual display. The display 310 in FIG. 3 may be configured to render two-dimensional (2D) or 3D imagery, which may comprise virtual content. Virtual content is rendered on the display 310 of the XR capable device 300 in a region which may be greater than, less than, or coextensive with a user's field-of-view. In some aspects, the display 310 may be a head-mounted display device or a non-head-mounted heads-up display device type.

The data input devices may include but are not limited to, combinations of one or more of touch-sensitive input devices 312, image sensors 314 and 316, an inertial measurement unit (IMU) 318, microphones 320 (e.g., voice or speech recognition devices), and any other suitable devices. The touch-sensitive input devices 312 may include keypads, keyboards, mouse devices, touch screens that accept gestures, and other devices that may facilitate interaction with the virtual reality experience. For instance, the touch-sensitive input devices 312 may be configured to receive user input to control the 3D virtual reality experience by varying visual content rendered on the XR display. User input received by the touch-sensitive input devices 312 may include touch, hover, and/or hand gesture input, for example, and may be sensed via any suitable touch sensing technology (e.g., capacitive, resistive, acoustic, optical).

The hardware 306 may further include a sensor system for tracking the touch-sensitive input devices. The sensor system may receive signals from the input device that enable tracking of the input device. The signals may be received via a wired or wireless connection to the input device, which may communicatively couple to the XR capable device via a direct connection or indirectly through a suitable network. The signals may include any suitable information enabling tracking of the input device, such as output from one or more inertial measurement units (e.g., accelerometer, gyroscope, magnetometer) in the input device, a global positioning system (GPS) sensor in the input device, etc. In some examples, the signals may indicate the position (e.g., in the form of a 3D coordinate) and/or orientation (e.g., in the form of a 3D rotational coordinate) of the input device. Alternatively, or in addition to receiving tracking signals from the input device, the sensor system may include one or more optical sensors for tracking the input device. For example, a sensor system may employ a visible light and/or depth camera to locate and segment image data corresponding to the input device from other image data.

The user input may influence the rendering of visual content in various ways. For example, the touch-sensitive input devices 312 may enable one or more drawings of visual content, which may be displayed on the XR capable device 300. The touch-sensitive input devices 312 may also enable the user to edit or manipulate visual content or select certain visual content. Such manipulations may occur simultaneously with one another. For example, the user may make gestures while simultaneously interacting with a mechanical component and/or another component of the XR capable user device 300. Additionally, the representation of a virtual environment on the display may be scrolled to change the visual content shown therein based on a gaze direction of a user. Thus, the sensor system may also include one or more gaze sensors configured to detect the gaze direction of the user. In another example, the sensor system may detect via an outward-facing image sensor, a hand gesture that effects the scrolling of the representation. Similarly, gaze, gestural, and/or other inputs may affect the display.

In some aspects, the data input devices may be a separate device 326 such as hand-held controllers, a game console, appliance, and/or so forth. In this regard, the XR capable device 300 may render a user interface that includes a representation of the data input devices. For instance, the user interface may render the data input device in 3D locations in the virtual reality experience that respectively correspond to the real-world locations of the data input device. Accordingly, rendering the data input device with substantially the same apparent size and angular orientation as their real-world counterparts, the portions may mimic and simulate the real-world appearance of the input device. Thus, the data input device may be represented convincingly and familiarly, and the user may be able to easily locate the data input device based on its real-world location. In some aspects, multiple user interfaces may be rendered on multiple devices. For instance, a first user interface may be rendered via the XR capable device 300, and a second user interface may be rendered via a separate device 326 such as a hand-held device. The second user interface may extend or augment the representation that may be rendered via the XR capable device 300. additionally, or alternatively, the second user interface may provide different functionalities than those provided by the first user interface.

The image sensors 314 and 316 may include inward facing image sensors 314 and outward facing image sensors 316. The one or more inward facing image sensors 314 may be configured to acquire gaze tracking information from a user's eyes. For example, the inward facing image sensors 314 may acquire image data for each of the user's eyes. The processor 304 may be configured to determine the gaze directions of each of a user's eyes in any suitable manner based on the information received from the image sensors 314. In other implementations, a different type of gaze detector/sensor may be employed to measure one or more gaze parameters of the user's eyes. Examples of gaze parameters measured by one or more gaze sensors that may be used by the processor 304 to determine an eye gaze sample may include an eye gaze direction, head orientation, eye gaze velocity, eye gaze acceleration, change in the angle of eye gaze direction, and/or any other suitable tracking information. In some implementations, eye gaze tracking may be recorded independently for both eyes.

The outward facing image sensors 316 may be configured to measure the physical environment attributes of physical space. In one example, the outward facing image sensors 316 may include a visible-light camera configured to collect a visible-light image of physical space. Further, the outward facing image sensor 316 may also include a depth camera configured to collect a depth image of physical space. More particularly, in one example, the depth camera is an infrared time-of-flight depth camera. In another example, the depth camera is an infrared structured light depth camera.

Data from the outward facing image sensors 316 may be used by the processor 304 to detect movements, such as gesture-based inputs or other movements performed by a user or by a person or physical object in the physical space. In one example, data from the outward facing image sensors 316 may be used to detect data input performed by the user, such as a gesture. Data from the outward facing image sensors 316 may be used by the processor 304 to determine direction/location and orientation data (e.g., from imaging environmental features) that enables position/motion tracking of the XR capable device 300 in the real-world environment. In some implementations, data from the outward facing image sensors 316 may be used by the processor 304 to construct still images and/or video images of the surrounding environment from the perspective of the XR capable device 300.

The IMU 318 may be configured to provide position and/or orientation data of the XR capable device 300. In one implementation, the IMU 318 may be configured as a three-axis or three-degree of freedom (3DOF) position sensor system. This example position sensor system may, for example, include three gyroscopes to indicate or measure a change in orientation of the XR capable device 300 within 3D space about three orthogonal axes (e.g., roll, pitch, and yaw).

In another example, the IMU 318 may be configured as a six-axis or six-degree of freedom (6DOF) position sensor system. Such a configuration may include three accelerometers and three gyroscopes to indicate or measure a change in location of the XR capable device 300 along three orthogonal spatial axes (e.g., x, y, and z) and a change in device orientation about three orthogonal rotation axes (e.g., yaw, pitch, and roll). In some implementations, position and orientation data from the outward facing image sensors 316 and the IMU 318 may be used in conjunction to determine a position and orientation (or 6DOF pose) of the XR capable device 300.

The XR capable device 300 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the user and/or external to the user including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD- ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 203 in the XR capable device 300.

The processor(s) 304 and the memory 308 of the XR capable device 300 may implement an operating system 322 and an XR application 324. The operating system 322 may include components that enable the XR capable device 300 to receive and transmit data via various interfaces (e.g., user controls, communication interface, and/or memory input/output devices), as well as process data using the processor(s) 304 to generate output. The operating system 322 may include a presentation component that presents the output (e.g., display the data on an electronic display, store the data in memory, transmit the data to another electronic device, etc.). Additionally, the operating system 322 may include other components that perform various additional functions generally associated with an operating system.

The XR application 324 may include routines, program instructions, objects, and/or data structures that perform particular tasks or implement particular abstract data types. For example, the XR application 324 may include one or more instructions which, when executed by the one or more processors 304, direct the computing devices 300 to perform operations related to providing a virtual reality experience. More specifically, a user may wear or operate the XR capable device 300 to interact with one or more digitally-generated entities (e.g., virtual content) rendered on the display of the XR capable device 300 to experience a life-like, convincing feeling of occupying the virtual reality environment. The XR application 324 may implement multiple input devices such as hand-held controllers as described above for facilitating such interaction. Aspects of the user may be tracked also as part of the virtual reality experience. For example, head motion and/or a gaze direction of the user may be tracked via one or more hardware components as described above so that virtual content is rendered responsive to changes in user position and/or orientation to provide an immersive and convincing virtual reality experience that reflects changes to the user's perspective.

Example Testing System Components

Figure 4:
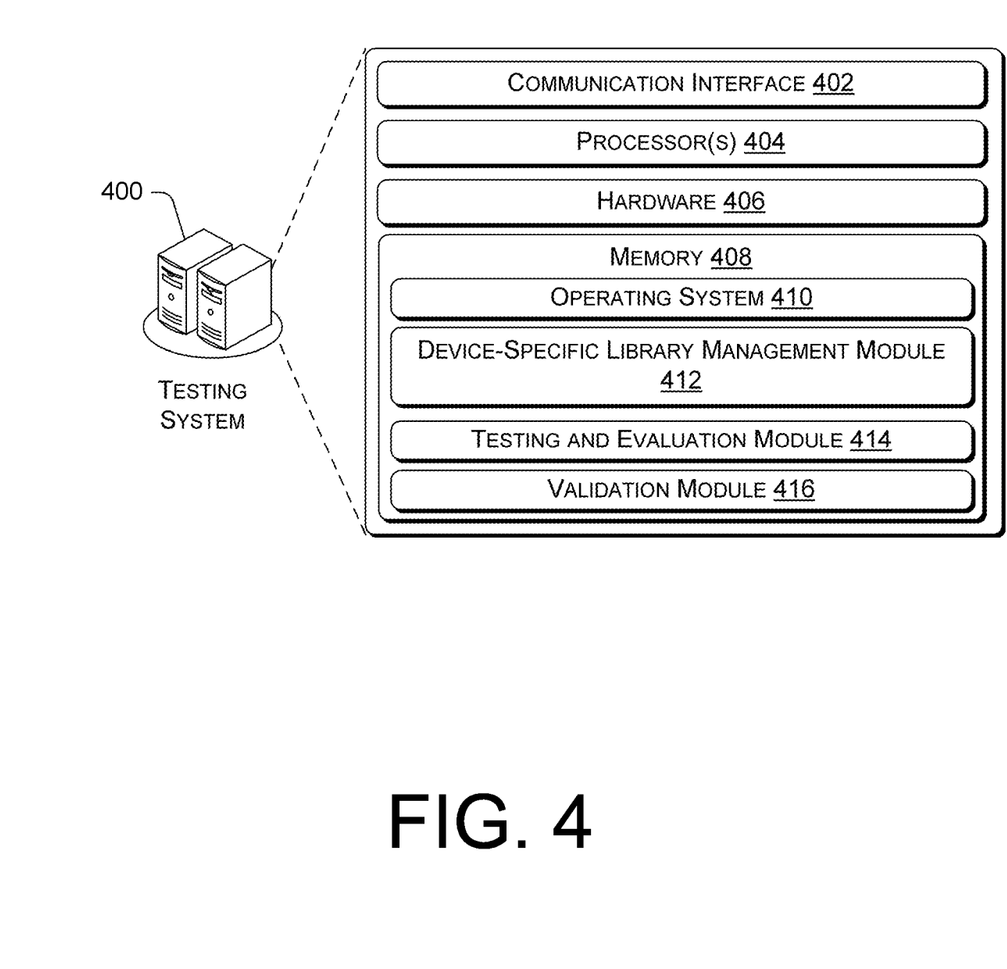
FIG. 4 is a block diagram showing various components of an illustrative testing system.

FIG. 4 is a block diagram showing various components of an illustrative computing device, wherein the computing device can comprise a testing system 400. It is noted that the testing system 400 as described herein can operate with more or fewer of the components shown herein. Additionally, the testing system 400 as shown herein or portions thereof can serve as a representation of one or more of the computing devices of the present system.

The testing system 400 may include a communication interface 402, one or more processors 404, hardware 406, and memory 408. The communication interface 402 may include wireless and/or wired communication components that enable the testing system 400 to transmit data to and receive data from other networked devices. In at least one example, the one or more processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 404 may also be responsible for executing all computer applications stored in the memory, which can be associated with common types of volatile (RAM) and/or nonvolatile (ROM) memory. The hardware 406 may include an additional user interface, data communication, or data storage hardware. For example, the user interfaces may include a data output device (e.g., visual display, audio speakers), and one or more data input devices. The data input devices may include but are not limited to, combinations of one or more keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer storage media and communications media. Computer storage media includes volatile and nonvolatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 408 may also include a firewall. In some embodiments, the firewall may be implemented as hardware 406 in the testing system 400.

The processor(s) 404 and the memory 408 of the testing system 400 may implement an operating system 410, a device-specific library management module 412, a testing and evaluation module 414, and a validation module 416. The operating system 410 may include components that enable the testing system 400 to receive and transmit data via various interfaces (e.g., user controls, communication interface, and/or memory input/output devices), as well as process data using the processor(s) 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The device-specific library management module 412, the testing and evaluation module 414, and the validation module 416 may include routines, program instructions, objects, and/or data structures that perform particular tasks or implement particular abstract data types. For example, the device-specific library management module 412 may include one or more instructions which, when executed by the one or more processors 404, direct the testing system 400 to perform operations related to interfacing with one or more device-specific libraries and/or other external systems operated or controlled by OEMs to onboard XR capable devices for validation testing. In some aspects, the device-specific library management module 412 may send a request for testing specifications and/or one or more software modules (e.g., SDK) and manage the received testing specifications and SDKs from multiple device-specific libraries operated by one or more OEMs. For example, the device-specific management module 412 may implement management logic to identify the XR capable device executing an XR application being validated and identify requisite and available testing specification and/or one or more software modules from a device-specific library associated with the XR capable device.

The testing and evaluation module 414 may include one or more instructions, which when executed by the one or more processors 404 direct one or more testing devices of the testing system 400 to perform operations related to performing validation tests based at least on test configurations. The testing and evaluation module 414 may perform the validation tests in the order in which the requests are received. Additionally, or alternatively, the testing and evaluation module 414 may prioritize one or more validation tests according to the test configurations. In this regard, the testing system 400 may implement one or more processor queues, which may include a high priority processor queue and a low priority processor queue in which various tests may be placed accordingly during the validation process.

In some aspects, the testing and evaluation module 414 may assign the individual testing devices to perform one or more validation tests. The individual testing devices may be selected via the testing and evaluation module 414 based at least on the testing specifications 106 and the testing device capabilities. For instance, individual testing devices may be equipped with different mechanical components or hardware for performing different functions. More specifically, a first testing device may be equipped with an image capture device and a second testing device may be equipped with a robotic arm and touch-sensitive input devices. In this example, the testing and evaluation module 414 may select the first testing device to perform comfort and usability tests and the second testing device to perform performance tests.

In some aspects, the first testing device and the second testing device may be configured to perform the same validation tests on multiple XR capable devices concurrently. Accordingly, the first testing device and the second testing device may include substantially similar mechanical components or hardware. Additionally, the multiple testing devices may be the same or different devices. As multiple testing devices may be employed to perform various validation tests, the testing and evaluation module 414 may interface with an output queue in which partial results of the validation tests are placed. In some aspects, the testing and evaluation module 414 may implement a load-balancing scheme comprising a round robin scheme, a lowest load first scheme, or the fastest throughput scheme.

The validation module 416 may include one or more instructions, which when executed by the one or more processors 404 direct the testing system 400 to perform operations related to generating a validation report and transmit the validation report to a testing log. In some aspects, the validation module 416 may analyze test results generated by one or more testing devices that execute one or more validation tests to determine whether the XR application is validated. The validation module 416 may analyze test results as individual validation tests are completed (e.g., in a sequence). Accordingly, the validation module 416 may instruct the testing and evaluation module 414 to terminate testing if one or more test results indicate that the XR application is not validated. Conversely, the validation module 416 may analyze test results when all validation tests are completed. In some aspects, the validation module 416 may analyze the test results in accordance with product requirements and evaluation criteria. Accordingly, the validation module 416 may indicate in the validation report whether the XR application is validated.

Example Process

Figure 5:
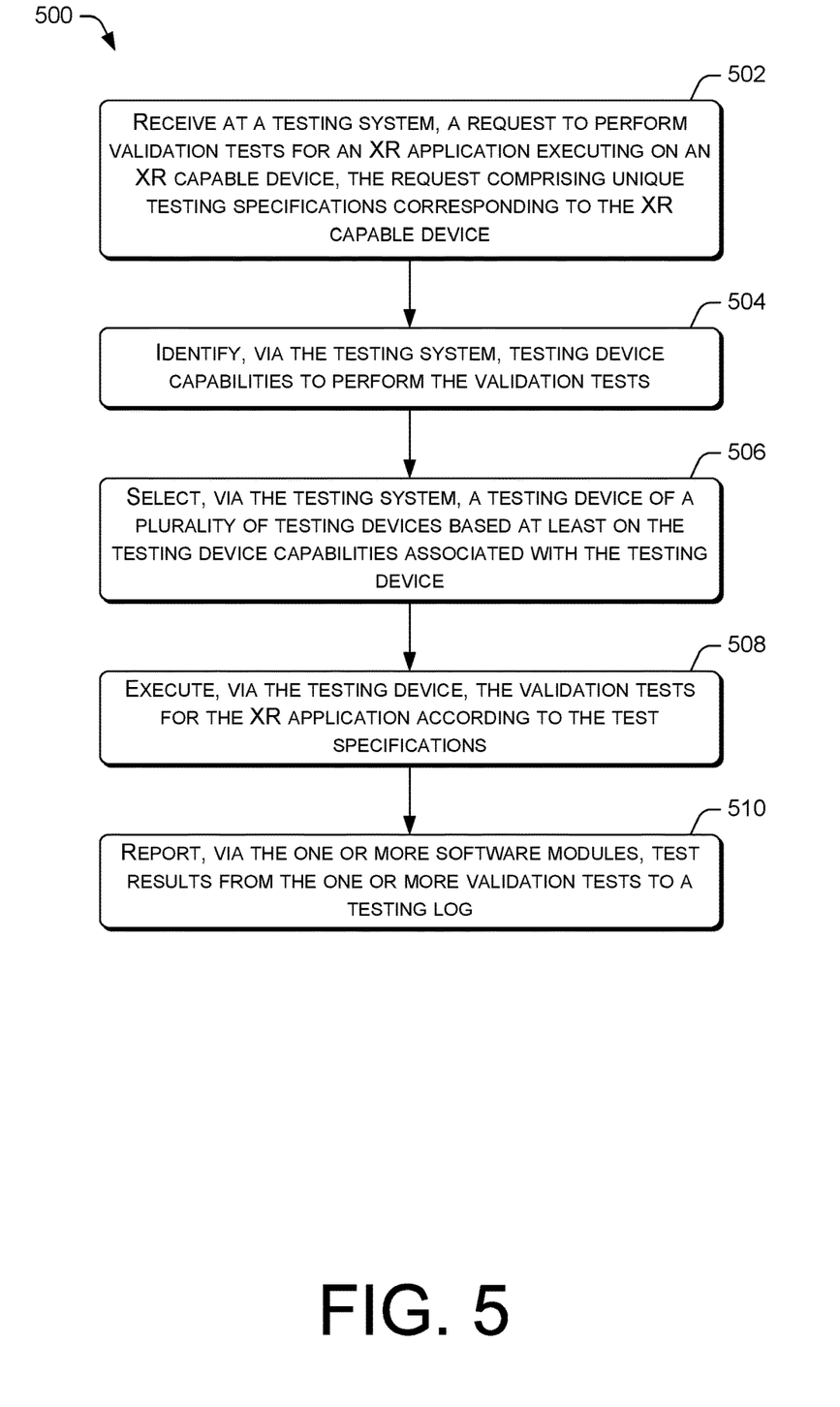
FIG. 5 is a flow diagram of an example process for performing multiple validation tests.
Figure 6:
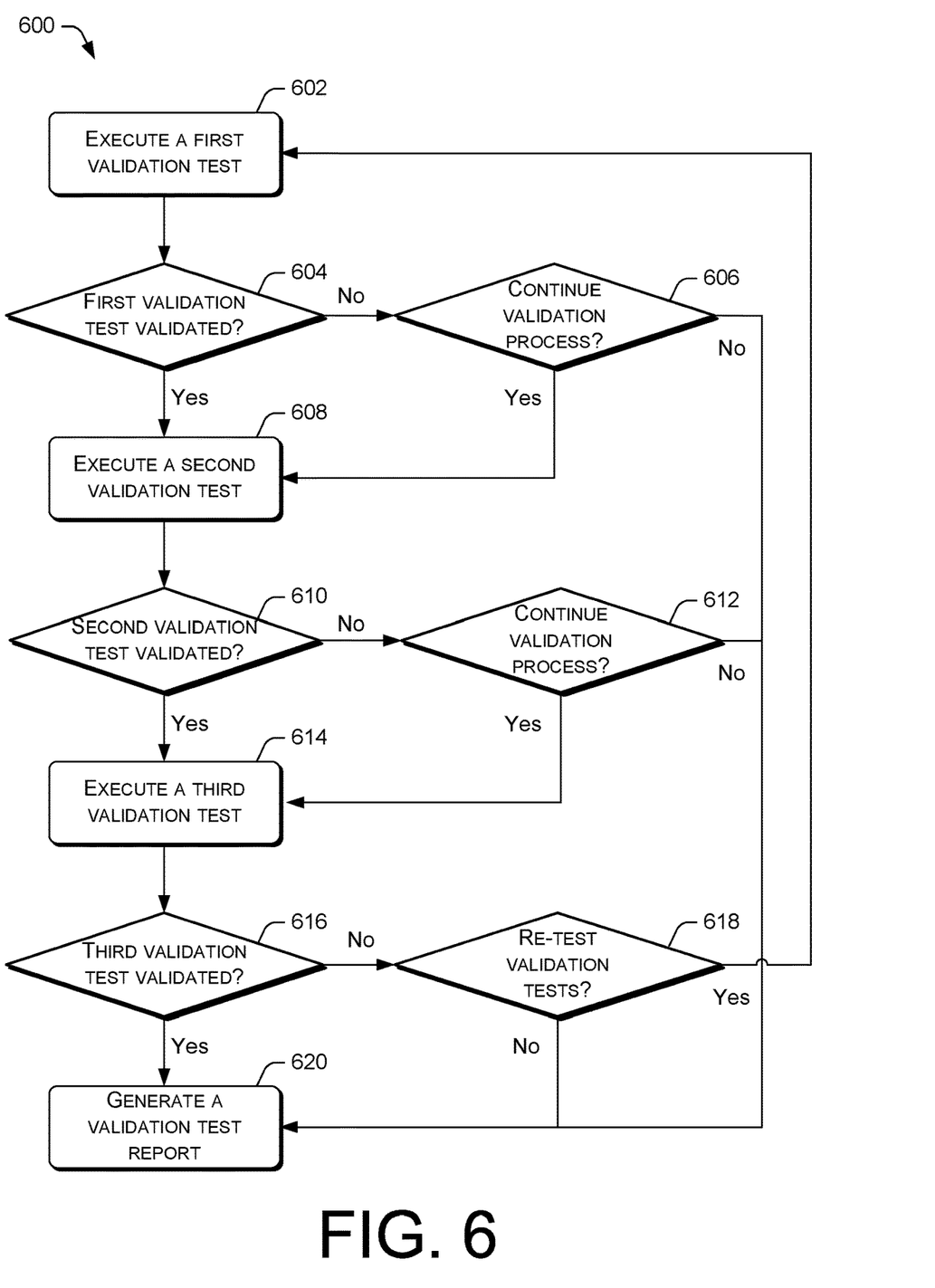
FIG. 6 is a flow diagram of an example process for determining the quality and usability of XR applications based at least on one or more validation tests.

FIGS. 5 and 6 present illustrative processes 500 and 600 for performing and managing multiple validation tests via a test system. The processes 500 and 600 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to FIGS. 1-4.

FIG. 5 is a flow diagram of an example process 500 for performing multiple validation tests. At block 502, a testing system may receive, from a testing entity, a request to perform validation tests for an XR application executing on an XR capable device. The XR capable device may be any number of user devices that may be configured to provide a virtual reality experience. In some embodiments, the request may include unique testing specifications corresponding to the XR capable device. The testing specifications may include information relating to the operating system, file system, hardware, and/or other software systems of an XR capable device. In some aspects, a device-specific library management module of the testing system may interface with one or more device-specific libraries and/or other external systems operated or controlled by OEMs to onboard XR capable devices for validation testing.

At block 504, a testing and evaluation module of the test system may identify testing device capabilities to perform the validation tests. The testing device capabilities may specify hardware such as mechanical components or sensors that may be used during the validation tests. At block 506, the testing and evaluation module of the testing system may select a testing device of a plurality of testing devices based at least on the testing device capabilities associated with the testing device. Accordingly, the testing device may be configured to perform one or more of the validation tests. In some aspects, one or more of the validation tests may be associated with a prioritization factor, indicating that the validation test is prioritized during the validation process. In this regard, the testing system may implement one or more processor queues, which may include a high priority processor queue and a low priority processor queue. Additional testing devices may be employed to perform prioritized validation tests. Multiple testing devices may perform validation tests concurrently. In some aspects, multiple testing devices may operate according to a load-balancing scheme.

At block 508, the testing device may execute the validation tests for the XR application according to the testing specifications. In some aspects, the testing device may output the results of the validation tests in an output queue. At block 510, a validation module of the testing system may report test results from the validation tests to a testing log. In some aspects, the validation module may analyze the test results to determine whether the XR application is validated based at least on one or more validation criteria (e.g., acceptance level, threshold value, expected result, etc.).

FIG. 6 is a flow diagram of an example process 600 for determining the quality and usability of XR applications based at least on one or more validation tests. The validation tests can include performance testing, comfort and usability testing, and input testing, depending upon embodiments. At block 602, a testing device of a testing system may execute a first validation test. At decision block 604, a validation module of the testing system may determine whether the first validation test is validated. For instance, the validation module may receive from the testing entity product requirements and/or validation criteria and compare the results of the validation test to such product requirements and/or the validation criteria. If the first validation test is not validated ("no" from block 604) based at least on the product requirements and/or the validation criteria, the testing device, via the validation module, may determine whether the validation process should continue, as indicated in block 606. If the validation process should continue ("yes" from block 606) or the first validation test is validated ("yes" from block 604), the process proceeds to block 608.

At block 608, the testing device may execute a second validation test. At decision block 610, the validation module may determine whether the second validation test is validated. In this regard, the validation module may receive additional product requirements and/or validation criteria and compare the results of the validation test to such additional product requirements and/or the validation criteria. If the second validation test is not validated ("no" from block 610) based at least on the additional product requirements and/or the validation criteria, the testing device, via the validation module, may determine whether the validation process should continue, as indicated in block 612. If the validation process should continue ("yes" from block 612) or the second validation test is validated ("yes" from block 610), the process proceeds to block 614.

At block 614, the testing device may execute a third validation test. At decision block 616, the validation module may determine whether the third validation test is validated. In this regard, the validation module may receive additional product requirements and/or validation criteria and compare the results of the validation test to such additional product requirements and/or the validation criteria. If the third validation test is not validated ("no" from block 616) based at least on the additional product requirements and/or the validation criteria, the testing device, via the validation module, may determine whether one or more validation tests should be re-tested, as indicated in block 618. If the one or more validation tests should be re-tested, then the process may go back to block 602. If the validation process should not continue ("no" from block 618) or the third validation test is validated ("yes" from block 616), the process proceeds to block 620.

At block 620, the validation module may generate a validation test report. The test report may be provided to a testing log, which may interface with a testing and evaluation process monitoring server that may be operated by the testing entity. The test report may include test results from the individual validation tests. The test results may indicate whether the one or more validation tests are validated. Additionally, or alternatively, the testing and evaluation process monitoring server may validate the XR application based at least on the results in view of the product requirements and the validation criteria.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving, at a testing system, a request to perform validation tests for an XR application executing on an XR capable device, the request comprising unique testing specifications corresponding to the XR capable device;
   identifying, via the testing system, testing device capabilities to perform the validation tests;
   selecting, via the testing system, a testing device of a plurality of testing devices based at least on the testing device capabilities associated with the testing device, the testing device being a robot device comprising mechanical components for making movements that initiate tactile interactions with the XR capable device or an image sensor device that aligns with a display screen of the XR capable device during the validation tests;
   executing, via the testing device, the validation tests for the XR application according to the testing specifications; and
   reporting, via the testing system, test results from the validation tests to a testing log.

2. The one or more non-transitory computer-readable media of claim 1, wherein the acts further comprise:
   validating the XR application based at least on the test results and one or more validation criteria.

3. The one or more non-transitory computer-readable media of claim 1, wherein the acts further comprise:
   selecting one of the validation tests to perform based at least on a prioritization factor that is associated with the one of the validation tests; and
   selecting an additional testing device of the plurality of testing devices based at least on the testing device capabilities associated with the additional testing device and the prioritization factor.

4. The one or more non-transitory computer-readable media of claim 3, wherein the testing device and the additional testing device are configured to perform the validation tests concurrently.

5. The one or more non-transitory computer-readable media of claim 1, wherein the validation tests comprise a performance test, a comfort and usability test, and an input test.

6. The one or more non-transitory computer-readable media of claim 1, wherein the testing device is equipped with hardware that is associated with the testing device capabilities.

7. The one or more non-transitory computer-readable media of claim 1, wherein the acts further comprise:
   selecting the testing device based at least on a load-balancing scheme.

8. A computer-implemented method, comprising:
- receiving, at a testing system, a request to perform validation tests for an XR application executing on an XR capable device, the request comprising unique testing specifications corresponding to the XR capable device;
- identifying, via the testing system, testing device capabilities to perform the validation tests;
- selecting, via the testing system, a testing device of a plurality of testing devices based at least on the testing device capabilities associated with the testing device, the testing device being a robot device comprising mechanical components for making movements that initiates tactile interactions with the XR capable device during the validation tests;
- executing, via the testing device, the validation tests for the XR application according to the testing specifications; and
- reporting, via the testing system, test results from the validation tests to a testing log.

9. The computer-implemented method of claim 8, further comprising:
- validating the XR application based at least on the test results and one or more validation criteria.

10. The computer-implemented method of claim 8, further comprising:
- selecting an additional testing device of the plurality of testing devices based at least on the testing device capabilities associated with the additional testing device;
- executing, via the testing device, a first validation test of the validation tests; and
- executing, via the additional testing device, a second validation test of the validation tests.

11. The computer-implemented method of claim 10, wherein the testing device and the additional testing device are configured to perform the validation tests concurrently.

12. The computer-implemented method of claim 8, wherein the validation tests comprise a performance test, a comfort and usability test, and an input test.

13. The computer-implemented method of claim 8, wherein the testing device is equipped with hardware that is associated with the testing device capabilities.

14. The computer-implemented method of claim 8, further comprising:
- selecting the testing device based at least on a load-balancing scheme.

15. A system, comprising:
- one or more non-transitory storage mediums configured to provide stored computer-readable instructions, the one or more non-transitory storage mediums coupled to one or more processors, the one or more processors configured to execute the computer-readable instructions to cause the one or more processors to:
  - receive, at a testing system, a request to perform validation tests for an XR application executing on an XR capable device, the request comprising unique testing specifications corresponding to the XR capable device;
  - identify, via the testing system, testing device capabilities to perform the validation tests;
  - select, via the testing system, a testing device of a plurality of testing devices based at least on the testing device capabilities associated with the testing device, the testing device being an image sensor device that aligns with a display screen of the XR capable device during the validation tests;
  - execute, via the testing device, the validation tests for the XR application according to the testing specifications; and
  - report, via the testing system, test results from the validation tests to a testing log.

16. The system of claim 15, wherein the one or more processors are further configured to:
- validate the XR application based at least on the test results and one or more validation criteria.

17. The system of claim 15, wherein the one or more processors are further configured to:
- select an additional testing device of the plurality of testing devices based at least on the testing device capabilities associated with the additional testing device and a load-balancing scheme.

18. The system of claim 15, wherein the validation tests comprise a performance test, a comfort and usability test, and an input test.

19. The system of claim 15, wherein the testing device is equipped with hardware that is associated with the testing device capabilities.

20. The system of claim 15, wherein the XR capable device comprises a head-mounted device.

\* \* \* \* \*